United States Patent
Turi et al.

(10) Patent No.: US 11,474,821 B1
(45) Date of Patent: Oct. 18, 2022

(54) PROCESSOR DEPENDENCY-AWARE INSTRUCTION EXECUTION

(71) Applicant: International Business Machines Corporation, Armonk, NY (US)

(72) Inventors: Amir Turi, Ramat Gan (IL); Avraham Ayzenfeld, Hod Hasharon (IL); Gilad Shimon Merran, Petach Tikva (IL); Yanai Danan, Tel Aviv (IL); Amit Shay, Kfar Saba (IL); Yossi Shapira, Shoham (IL); Yair Fried, Petah Tiqwa (IL); Oren Ben Gigi, Yavne (IL); Omri Rafaeli, Beer Sheba (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/318,252

(22) Filed: May 12, 2021

(51) Int. Cl.
*G06F 9/38* (2018.01)

(52) U.S. Cl.
CPC .......... *G06F 9/3838* (2013.01); *G06F 9/3855* (2013.01)

(58) Field of Classification Search
None
See application file for complete search history.

(56) References Cited

U.S. PATENT DOCUMENTS

| | | | |
|---|---|---|---|
| 6,782,469 B1 * | 8/2004 | Wilkerson | G06F 9/3824 |
| | | | 712/216 |
| 6,928,533 B1 | 8/2005 | Eisen | |
| 9,128,725 B2 | 9/2015 | Meier | |
| 9,262,160 B2 | 2/2016 | Heil | |
| 10,437,595 B1 | 10/2019 | Kanapathipillai | |
| 2009/0063823 A1 | 3/2009 | Burky | |
| 2013/0339595 A1 * | 12/2013 | Kumar | G06F 9/3838 |
| | | | 711/158 |
| 2014/0281404 A1 * | 9/2014 | Iyengar | G06F 9/3842 |
| | | | 712/216 |
| 2017/0364358 A1 * | 12/2017 | Adeeb | G06F 9/3863 |
| 2019/0163481 A1 | 5/2019 | Ayzenfeld | |

OTHER PUBLICATIONS

Pimentel, A., "Processor micro-architecture: Implicit parallelism, Pipelining, scalar & superscalar execution", Advances in Computer Architecture, 97 pps., <https://staff.fnwi.uva.nl/a.d.pimentel/psa/2-aca-procs.pdf>.

* cited by examiner

*Primary Examiner* — Courtney P Carmichael-Moody
(74) *Attorney, Agent, or Firm* — Monchai Chuaychoo

(57) ABSTRACT

In an approach to processor dependency-aware instruction execution, responsive to a new instruction being issued to an instruction issue queue in a processor, a future dependency count is incremented for each instruction of a plurality of instructions in the instruction issue queue that has a dependency on the new instruction. The plurality of instructions in the instruction issue queue are prioritized based on the future dependency count. The highest priority instruction of the plurality of instructions in the instruction issue queue is issued.

17 Claims, 6 Drawing Sheets

PROCESSOR DEPENDENCY-AWARE INSTRUCTION EXECUTION

BACKGROUND

The present invention relates generally to the field of data processing equipment, and more particularly to processor dependency-aware instruction execution.

A pipeline is a set of data processing elements connected in series, where the output of one element is the input of the next one. The elements of a pipeline are often executed in parallel or in time-sliced fashion. Pipeline processing refers to overlapping operations by moving data or instructions into a conceptual pipe with all stages of the pipe performing simultaneously. For example, while one instruction is being executed, the processor is decoding the next. Buffer storage is typically inserted between elements, especially if one pipeline stage is significantly slower than others since lack of buffering would stall the pipeline. A pipeline allows multiple instructions to be processed simultaneously. While one stage of an instruction is being processed, other instructions may be undergoing processing at a different stage.

Instruction pipelines are used in central processing units (CPUs) and other microprocessors to allow overlapping execution of multiple instructions with the same circuitry. The circuitry is usually divided up into stages and each stage processes a specific part of one instruction at a time, passing the partial results to the next stage. Examples of stages are instruction decode, arithmetic/logic and register fetch. They are related to the technologies of superscalar execution, operand forwarding, speculative execution and out-of-order execution.

SUMMARY

Embodiments of the present invention disclose an apparatus for processor dependency-aware instruction execution. In one embodiment, responsive to a new instruction being issued to an instruction issue queue in a processor, a future dependency count is incremented for each instruction of a plurality of instructions in the instruction issue queue that has a dependency on the new instruction. The plurality of instructions in the instruction issue queue are prioritized based on the future dependency count. The highest priority instruction of the plurality of instructions in the instruction issue queue is issued.

DETAILED DESCRIPTION

Out-of-Order (OoO) execution is a technique used in most high-performance microprocessors to make use of cycles that would otherwise be wasted. The key concept of OoO execution is to allow the processor to avoid stalls that occur when the data needed to perform an operation is not available. OoO processors fill these time slots with other instructions that are ready, then re-order the results at the end of execution to make it appear that the instructions were processed as normal. Typically, a CPU has an out of order window on the next n instructions that need to be executed. The CPU checks which instruction within the window can be executed without waiting for a result of a former instruction (i.e., not a dependent instruction). In the current art, the CPU chooses the next instruction to execute from the list of non-dependent instructions, which is typically the oldest instruction in the list. But if that instruction has future dependencies, i.e., other instructions in the list that cannot execute while that instruction executes, then the execution unit will stall, and CPU cycles are wasted. This leads to a decrease in performance.

To solve this problem, the present invention is an enhancement to the run-time issue mechanism that utilizes awareness of these dependencies. In an embodiment of the present invention, each instruction will include information about dependencies from "future" instructions that are currently in the instruction queue. The enhanced issue mechanism will prioritize those instruction that may solve "future" dependencies quicker.

In the present invention, the order of execution of the instruction stream is adjusted for optimized out-of-order instruction execution. In an embodiment of the present invention, new processor instructions are issued to the standard issue queue for execution in the processor core. The present invention then performs a dependency check to determine which of the newly issued instructions have future dependencies from other instructions that are currently in the issue queue. Each instruction will therefore include information about dependencies from future instructions that are currently in the issue queue. When the present invention determines that an instruction does not have any dependencies, it inserts that instruction into a non-dependent instruction queue. Instructions are then issued by prioritizing the instructions based on a future dependency tree. An example of prioritizing the instruction execution by the present invention is given in FIG. 2 below.

Figure 1:
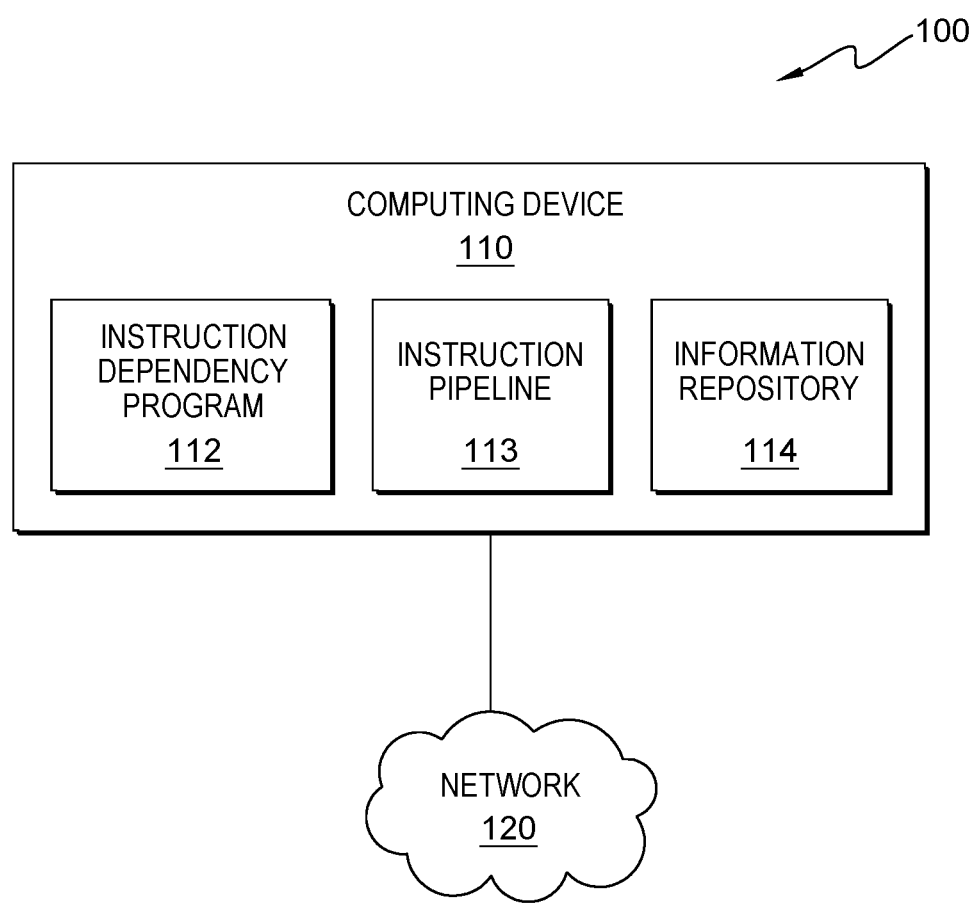
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of instruction dependency program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes instruction dependency program 112. In an embodiment, instruction dependency program 112 is a program, application, or subprogram of a larger program for processor dependency-aware instruction execution. In an alternative embodiment, instruction dependency program 112 may be located on any other device accessible by computing device 110 via network 120.

In an embodiment, computing device 110 includes instruction pipeline 113. In an embodiment, instruction pipeline 113 is the pipeline for execution of instructions in the processor core(s) that is manipulated by instruction dependency program 112 for optimized out-of-order instruction execution.

In an embodiment, computing device 110 includes information repository 114. In an embodiment, information repository 114 may be managed by instruction dependency program 112. In an alternate embodiment, information repository 114 may be managed by the operating system of the device, alone, or together with, instruction dependency program 112. Information repository 114 is a data repository that can store, gather, compare, and/or combine information. In some embodiments, information repository 114 is located externally to computing device 110 and accessed through a communication network, such as network 120. In some embodiments, information repository 114 resides on computing device 110. In some embodiments, information repository 114 may reside on another computing device (not shown), provided that information repository 114 is accessible by computing device 110. Information repository 114 includes, but is not limited to, program data, instruction data, dependency data, algorithm data, priority data, and other data that is received by instruction dependency program 112 from one or more sources, and data that is created by instruction dependency program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Figure 2:
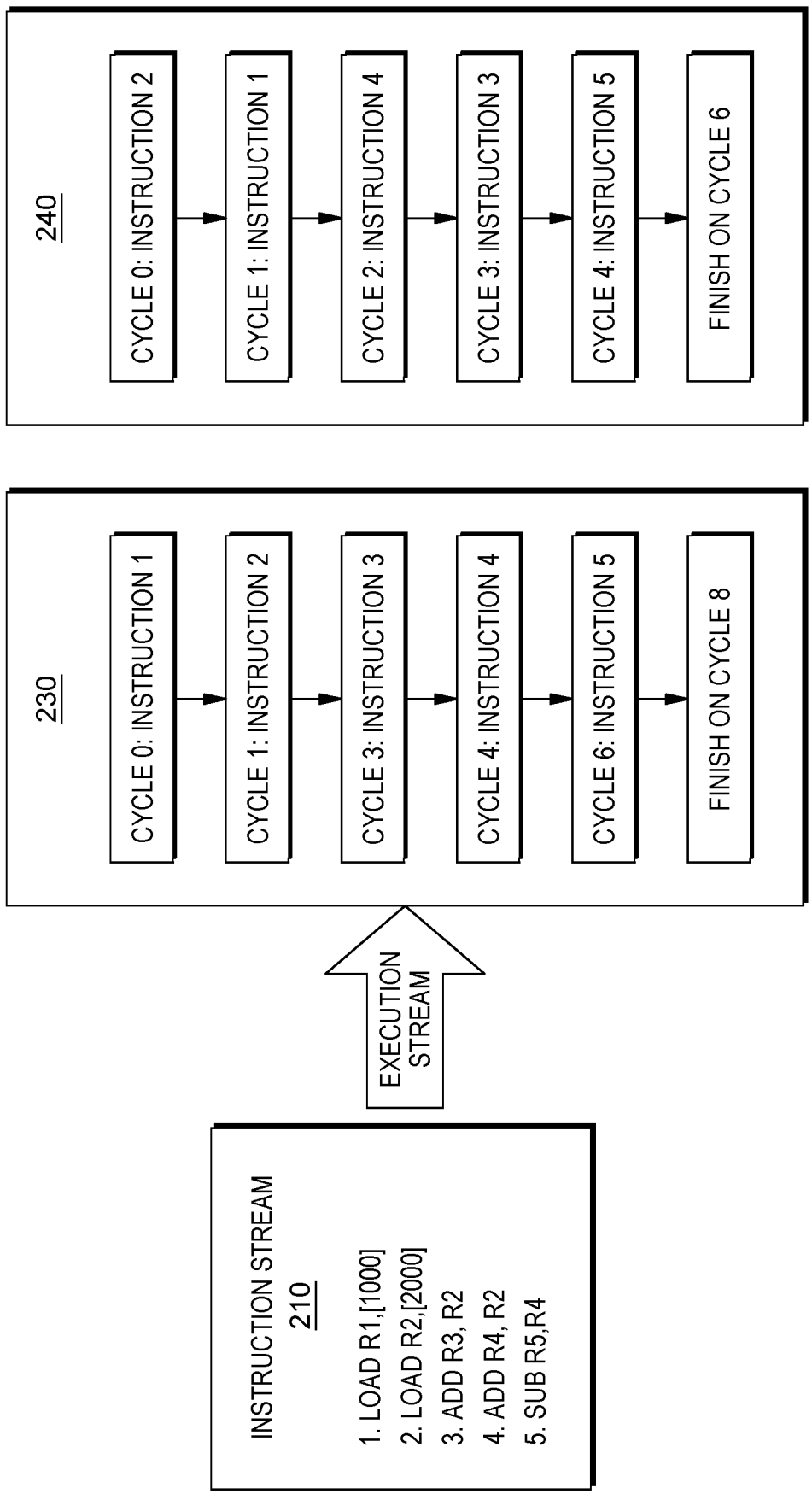
FIG. 2 is an example comparison of the execution order of processor instructions using the existing art and the present invention, in accordance with an embodiment of the present invention.

FIG. 2 is an example comparison of the execution order of processor instructions using the current art and the present invention, in accordance with an embodiment of the present invention. In the example of FIG. 2, the execution order of a series of five instructions is shown for both the current art and the present invention. In this example, an execution stream is assumed that has one execution pipeline and where each instruction requires two instruction cycles to execute. In this example, Instruction Stream 210 contains five instructions to be executed. These five instructions are passed into the instruction pipeline to generate two possible instruction execution pipelines.

In Instruction Pipeline 230, the order of instruction execution is displayed using the current art. Here, the five instructions of instruction stream 210 are executed in the order they were received, i.e., oldest first. Since each instruction requires two instruction cycles to execute, the first two instructions are started in cycles 0 and 1 respectively, but since instruction 3 requires register 2 (R2), and R2 is in use by instruction 2 for cycles 1 and 2, instruction 3 cannot enter the instruction pipeline until cycle 3. Therefore, no instruction can start executing in cycle 2, and the instruction pipeline is stalled for one cycle. Likewise, instruction 4, which utilizes register 4 (R4), starts in cycle 4, but instruction 5 also utilizes R4, so it cannot start until instruction 4 completes after cycle 5. As a result, cycle 5 is also a stalled cycle, instruction 5 will execute in cycles 6 and 7, and the entire series will not be complete by the start of cycle 8.

In Instruction Pipeline 240, the order of instruction execution is displayed using the present invention. Here, the order of execution of the five instructions of instruction stream 210 is adjusted by instruction dependency program 112 for optimized out-of-order instruction execution. In this example, instruction dependency program 112 determines that instruction 2 has a future dependency with instructions 3 and 4, and therefore instruction dependency program 112 executes instruction 2 in cycle 0. Since neither instruction 3 nor instruction 4 can execute in cycle 1, and since instruction 1 has no dependencies, instruction dependency program 112 pushes instruction 1 into the instruction pipeline in cycle 1. In cycle 2, since instruction 2 has completed, either instruction 3 or instruction 4 can execute, since either requires R2. Instruction dependency program 112, however, determines that instruction 4 has a future dependency in instruction 5, and therefore executes instruction 4 in cycle 2. Since instruction 5 cannot begin execution in cycle 3 due to its dependency on instruction 4, and since instruction 3 has no dependencies, instruction dependency program 112 inserts instruction 3 into the instruction pipeline in cycle 3. In cycle 4, instruction dependency program 112 inserts instruction 5 into the instruction pipeline since the instruction that it depends on, instruction 4, has now completed. Instruction 5 then executes in cycles 4 and 5, and the entire series will be complete by the start of cycle 6, two instruction cycles earlier than the current art.

Figure 3:
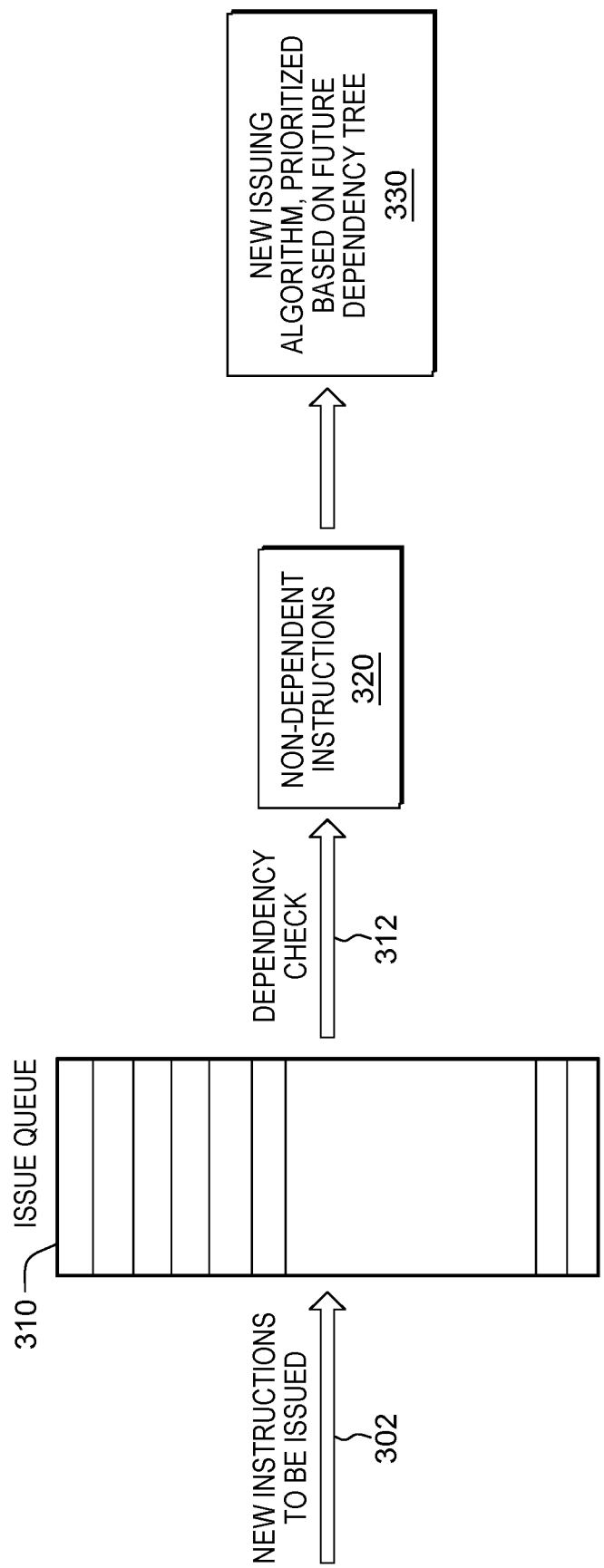
FIG. 3 is an example of the operation of a typical instruction queue design incorporating the present invention in the design flow, in accordance with an embodiment of the present invention.

FIG. 3 is an example of the operation of a typical instruction queue design incorporating the present invention in the design flow, in accordance with an embodiment of the present invention. In step 302 of this example, new processor instructions are issued to Issue Queue 310, the standard issue queue for operation execution in the processor core. Instruction dependency program 112 then performs Dependency Check 312 to determine which of the instructions received in step 302 have future dependencies from other instructions that are currently in issue queue 310. Each instruction will therefore include information about dependencies from future instructions that are currently in issue queue 310. When instruction dependency program 112 determines that an instruction does not have any dependencies, then instruction dependency program 112 inserts that instruction into Non-Dependent Instruction Queue 320. Instructions are then issued by instruction dependency program 112 based on New Issuing Algorithm 330, which prioritizes the instructions based on a future dependency tree. An example of one embodiment of instruction dependency program 112 for prioritizing the instruction execution is given in FIG. 2 above.

Figure 4:
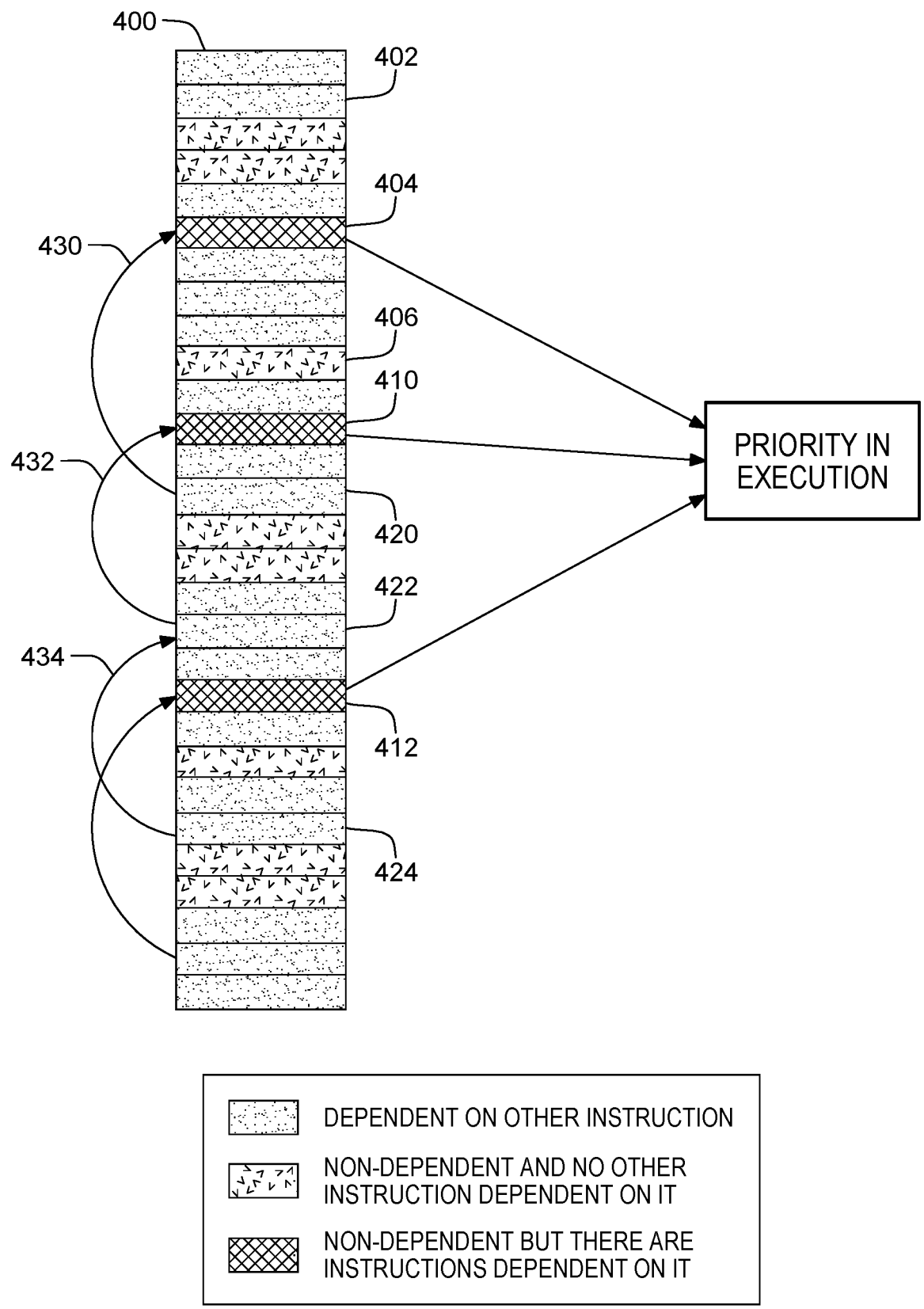
FIG. 4 is an example of the execution order of processor instructions, in accordance with an embodiment of the present invention.

FIG. 4 is an example of the execution order of processor instructions, in accordance with an embodiment of the present invention. In the example of FIG. 4, three classes of instructions are displayed in instruction pipeline 400. Dependent Instruction 402 is a member of a class of instructions that are dependent on other instructions. This means that, as explained in FIG. 2 above, dependent instruction 402 cannot execute until an instruction on which it depends has completed execution. Non-Dependent Instruction 406 is a member of a class of instructions that are not dependent on other instructions, and no other instructions are dependent on non-dependent instruction 406. This means that nodependent instruction 406 can be executed at any time. Non-dependent Instruction with Dependencies 404 is a member of a class of instructions that are that are not dependent on other instructions, but there are other instructions that are dependent on non-dependent instruction with dependencies 404. This means that, as explained in FIG. 2 above, non-dependent instruction with dependencies 404 can be executed at any time, but the actual placement of non-dependent instruction with dependencies 404 in the execution stream may impact the execution of other instructions. Instruction dependency program 112 will, therefore, place non-dependent instruction with dependencies 404 in the instruction pipeline based on a determination of the optimal ordering of the instructions to maximize processor throughput.

In this example, non-dependent instruction with dependencies 404 is dependent on dependent instruction 420, as shown by dependency 430; non-dependent instruction with dependencies 410 is dependent on dependent instruction 422, as shown by dependency 432; and non-dependent instruction with dependencies 412 is dependent on dependent instruction 424, as shown by dependency 434. As a result of these dependencies, instruction dependency program 112 will, therefore, prioritize the execution of non-dependent instructions with dependencies 404, 410, and 412 to optimize the instruction queue.

Figure 5:
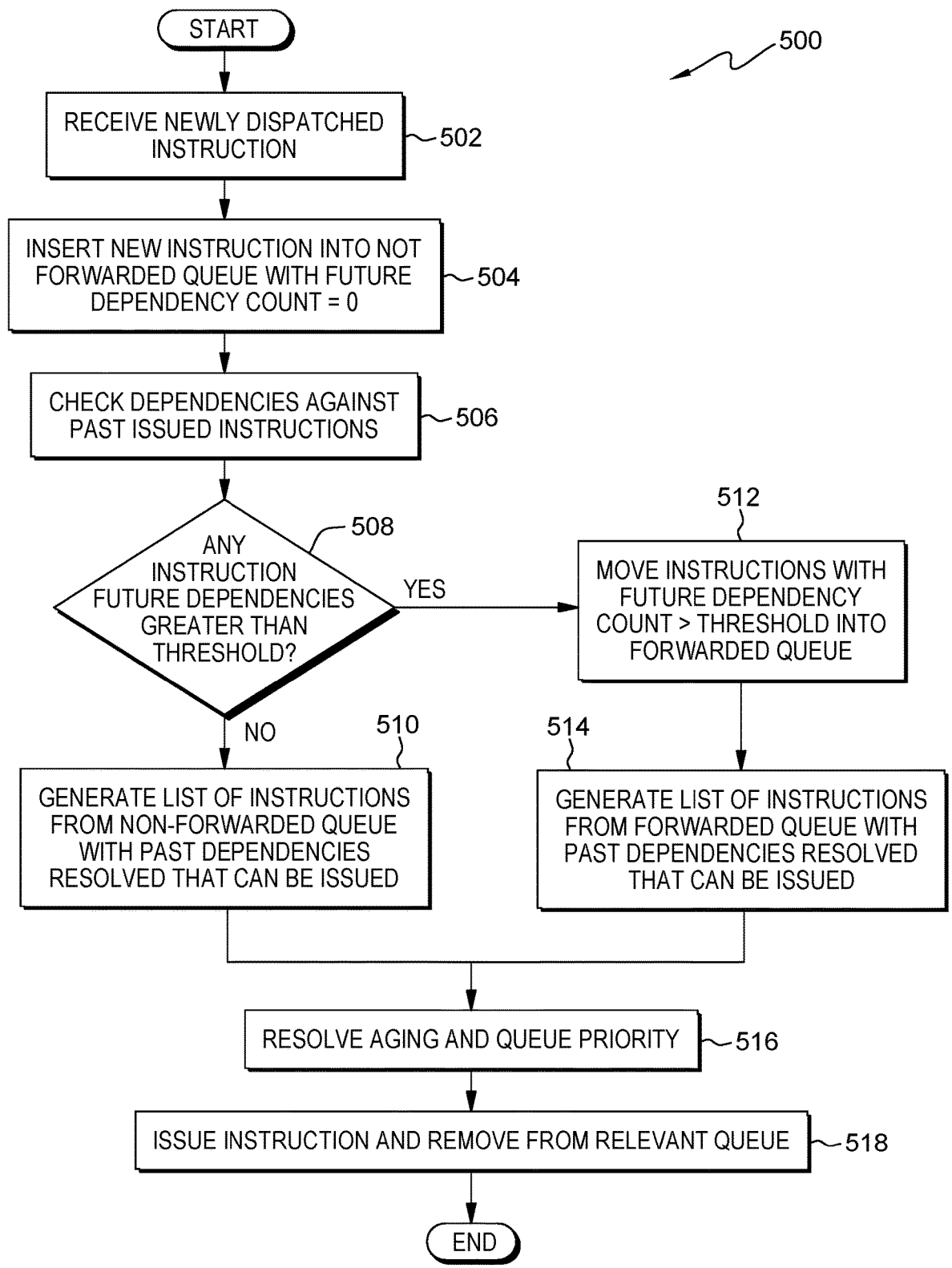
FIG. 5 is the flowchart for the steps for the instruction dependency program, in accordance with an embodiment of the present invention.

FIG. 5 is the flowchart for the steps for the instruction dependency program, in accordance with an embodiment of the present invention. In an alternative embodiment, the steps of workflow 500 may be performed by any other program while working with instruction dependency program 112. It should be appreciated that embodiments of the present invention provide at least for processor dependency-aware instruction execution. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

Instruction dependency program 112 receives a newly dispatched instruction (step 502). In an embodiment, instruction dependency program 112 receives a newly dispatched instruction from the issue queue.

Instruction dependency program 112 inserts the new instruction into a Not Forwarded Queue with a future dependency count=0 (step 504). In an embodiment, instruction dependency program 112 creates a dependency count for the newly dispatched instruction and initially sets the dependency count to 0. In an embodiment, instruction dependency program 112 inserts the newly dispatched instruction into a Not Forwarded Queue. In an embodiment, the Not Forwarded Queue is ordered from oldest instruction to youngest instruction, based on the time the instruction entered the queue.

Instruction dependency program 112 checks dependencies against past issued instructions (step 506). In an embodiment, instruction dependency program 112 scans the entries in the Not Forwarded Queue to determine if the new instruction has any dependencies on instructions already in the queue, or if any instructions already in the queue have any dependencies on the new instruction. In an embodiment, instruction dependency program 112 increments the dependency count for every instruction already in the Not Forwarded Queue that the newly dispatched instruction is dependent on.

For example, if instructions 1, 2, and 3 are in the queue each with a future dependency count of 0, and if a new instruction is dispatched (instruction 4) which has a dependency to instruction 1 and instruction 3, then instruction dependency program 112 will increase the future dependency count of instruction 1 and instruction 3 by 1 each.

Model deployment program 112 determines if any instructions have future dependencies greater than a threshold (decision block 508). In an embodiment, instruction dependency program 112 compares the number of dependencies found in step 506 for every instruction already in the Not Forwarded Queue that the newly dispatched instruction is dependent on to a predetermined threshold. In an embodiment, if instruction dependency program 112 determines that the number of dependencies found for any instruction already in the Not Forwarded Queue that the newly dispatched instruction is dependent on does not exceed a predetermined threshold ("no" branch, decision block 508), then instruction dependency program 112 proceeds to step 510. In an embodiment, if instruction dependency program 112 determines that the number of dependencies found for any instruction already in the Not Forwarded Queue that the newly dispatched instruction is dependent on does exceed a predetermined threshold ("yes" branch, decision block 508), then instruction dependency program 112 proceeds to step 512 to insert those instructions into the Forwarded Queue. It should be noted that the decision to leave an instruction in the Not Forwarded Queue, or to move the instruction into the Forwarded Queue, is performed independently for each instruction in the Not Forwarded Queue that has dependencies on the newly dispatched instruction.

Instruction dependency program 112 generates a list of instructions from the Non-Forwarded Queue with past dependencies resolved that can be issued (step 510). In an embodiment, if instruction dependency program 112 determines in decision block 508 that the number of dependencies found for any instructions already in the Not Forwarded Queue that the newly dispatched instruction is dependent on does not exceed a predetermined threshold, then these instructions do not have sufficient, or any, dependencies, and therefore these instruction do not need to be forwarded. Therefore, instruction dependency program 112 leaves these instructions in the Not Forwarded Queue. In an embodiment, if the predetermined threshold for the number of dependencies is not 0, then some instructions in the Not Forwarded Queue may have dependencies. In an embodiment, instruction dependency program 112 generates a list of instructions from the Not Forwarded Queue with past dependencies resolved that can be issued. This list includes those instructions that do not have any dependencies in addition to instructions that have had their dependencies resolved by instruction dependency program 112.

Instruction dependency program 112 moves instructions with a future dependency count >a threshold into Forwarded Queue (step 512). In an embodiment, if instruction dependency program 112 determines in decision block 508 that the number of dependencies found for any instructions in the Not Forwarded Queue that the newly dispatched instruction is dependent on does exceed a predetermined threshold, then these instructions have dependencies that can lead to a stalled queue, and these instructions needs to be forwarded to improve performance. Therefore, instruction dependency program 112 inserts these instructions into the Forwarded Queue. Instruction dependency program 112 then proceeds to step 514 to generate a list of instructions with dependencies resolved.

In another embodiment, if instruction dependency program 112 determines in decision block 508 that the number of dependencies found for one or more instructions in the Not Forwarded Queue that the newly dispatched instruction is dependent on exceed a predetermined threshold, and all past dependencies for the one or more instructions have been resolved, then the one or more instructions have dependencies that can lead to a stalled queue, and these instructions need to be forwarded to improve performance. Therefore, instruction dependency program 112 inserts these instructions into the Forwarded Queue. In this embodiment, since all past dependencies for the one or more instructions have already been resolved, instruction dependency program 112 therefore proceeds to step 516 to resolve the aging and queue priority.

Instruction dependency program 112 generates a list of instructions from the Forwarded Queue with past dependencies resolved that can be issued (step 514). In an embodiment, instruction dependency program 112 generates a list of instructions from the Forwarded Queue with past dependencies resolved that can be issued.

Instruction dependency program 112 resolves aging and queue priority (step 516). In an embodiment, instruction dependency program 112 merges the lists of instructions from the Not Forwarded Queue and Forwarded Queue with past dependencies resolved into the instruction pipeline. In an embodiment, if the list of instructions from the Forwarded Queue with past dependencies resolved is not empty, then instruction dependency program 112 gives the instructions in the Forwarded Queue the highest priority and inserts these instructions into the instruction pipeline first (by age, with older instructions first). In an embodiment, if the list of instructions from the Forwarded Queue with past dependencies resolved is empty, then instruction dependency program 112 inserts instructions from the list of instructions from the Not Forwarded Queue with past dependencies resolved into the instruction pipeline (by age, with older instructions first).

In an embodiment, if there are instructions in the list of instructions from the Forwarded Queue with past dependencies resolved but less than the maximal number that can issue each cycle, then instruction dependency program 112 inserts all the instructions from the list of instructions from the Forwarded Queue with past dependencies resolved and some from the list of instructions from the Not Forwarded Queue with past dependencies resolved into the instruction pipeline. In an embodiment, instruction dependency program 112 will prioritize the instructions from the list of instructions from the Forwarded Queue and inserts instruction from the list of instructions from the Not Forwarded Queue into the instruction pipeline in cycles where no instructions from the list of instructions from the Forwarded Queue can execute due to dependencies. This embodiment is illustrated in FIG. 2 above.

Instruction dependency program 112 issues the instruction and removes the instruction from the relevant queue (step 518). In an embodiment, instruction dependency program 112 issues the highest priority instruction from the instruction pipeline. In an embodiment, if the number of instructions from the Forwarded Queue with past dependencies resolved is less than the maximal number that can be sent each cycle, then instruction dependency program 112 issues all the instructions from the Forwarded Queue with past dependencies resolved and a number of instructions from the Not Forwarded Queue to equal the maximal number of instructions that can issue each cycle. In an embodiment, instruction dependency program 112 then removes the issued instructions from the appropriate queues, either the Forwarded Queue or the Not Forwarded Queue, or both, and then ends for this cycle.

Figure 6:
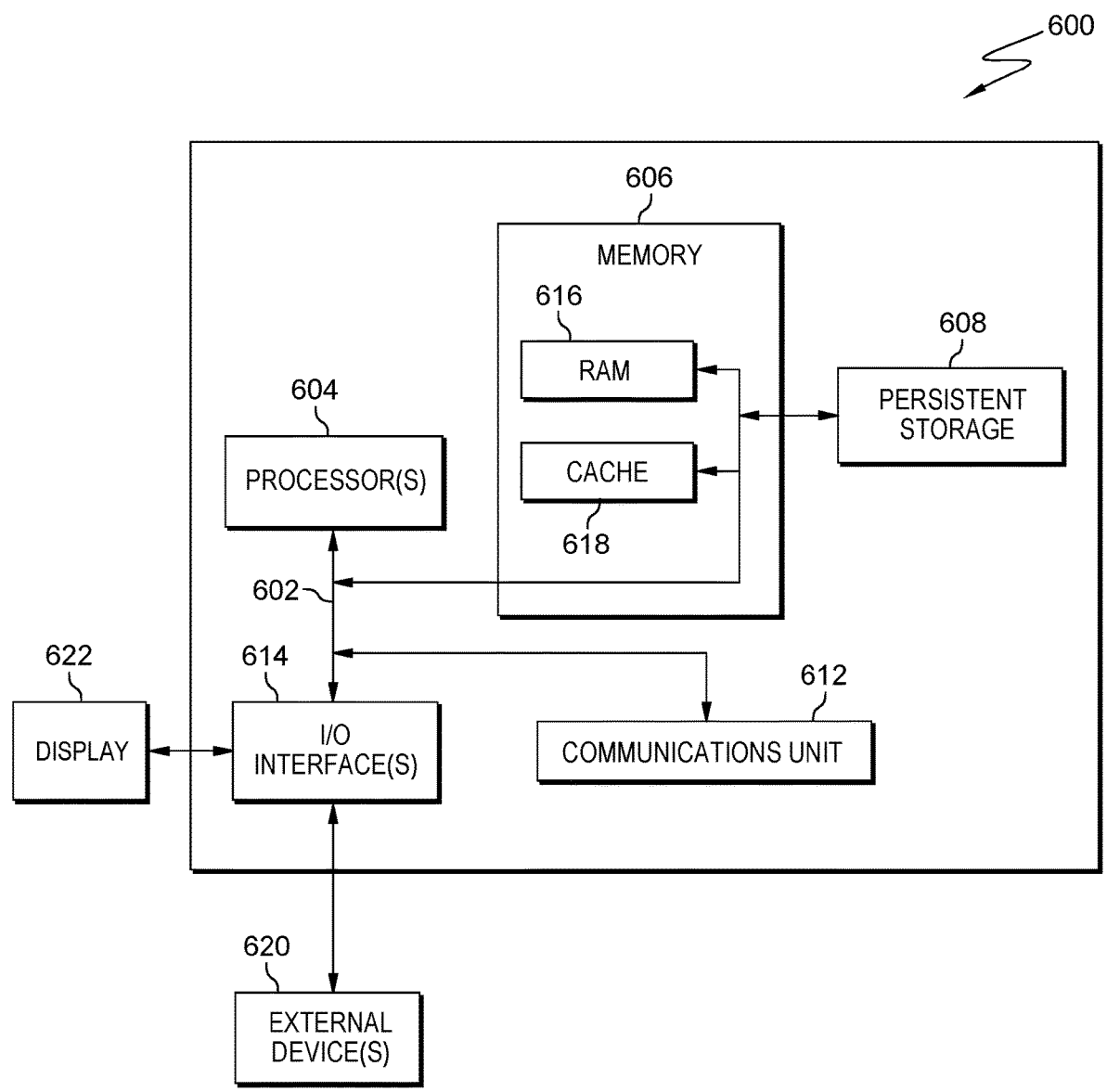
FIG. 6 depicts a block diagram of components of the computing device executing the instruction dependency program within the distributed data processing environment of FIG. 1, in accordance with an embodiment of the present invention.

FIG. 6 is a block diagram depicting components of computing device 110 suitable for instruction dependency program 112, in accordance with at least one embodiment of the invention. FIG. 6 displays computer 600; one or more processor(s) 604 (including one or more computer processors); communications fabric 602; memory 606, including random-access memory (RAM) 616 and cache 618; persistent storage 608; communications unit 612; I/O interfaces 614; display 622; and external devices 620. It should be appreciated that FIG. 6 provides only an illustration of one embodiment and does not imply any limitations with regard to the environments in which different embodiments may be implemented. Many modifications to the depicted environment may be made.

As depicted, computer 600 operates over communications fabric 602, which provides communications between computer processor(s) 604, memory 606, persistent storage 608, communications unit 612, and I/O interface(s) 614. Communications fabric 602 may be implemented with any architecture suitable for passing data or control information between processors 604 (e.g., microprocessors, communications processors, and network processors), memory 606, external devices 620, and any other hardware components within a system. For example, communications fabric 602 may be implemented with one or more buses.

Memory 606 and persistent storage 608 are computer readable storage media. In the depicted embodiment, memory 606 comprises RAM 616 and cache 618. In general, memory 606 can include any suitable volatile or non-volatile computer readable storage media. Cache 618 is a fast memory that enhances the performance of processor(s) 604 by holding recently accessed data, and near recently accessed data, from RAM 616.

Program instructions for instruction dependency program 112 may be stored in persistent storage 608, or more generally, any computer readable storage media, for execution by one or more of the respective computer processors 604 via one or more memories of memory 606. Persistent storage 608 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. In the context of some embodiments of the present invention, the source of the various input data may be physically remote to computer 600 such that the input data may be received, and the output similarly transmitted via communications unit 612.

I/O interface(s) 614 allows for input and output of data with other devices that may be connected to computer 600. For example, I/O interface(s) 614 may provide a connection to external device(s) 620 such as a keyboard, a keypad, a touch screen, a microphone, a digital camera, and/or some other suitable input device. External device(s) 620 can also include portable computer readable storage media such as, for example, thumb drives, portable optical or magnetic disks, and memory cards. Software and data used to practice embodiments of the present invention, e.g., instruction dependency program 112, can be stored on such portable computer readable storage media and can be loaded onto persistent storage 608 via I/O interface(s) 614. I/O interface(s) 614 also connect to display 622.

Display 622 provides a mechanism to display data to a user and may be, for example, a computer monitor. Display 622 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for processor dependency-aware instruction execution, the computer-implemented method comprising:

responsive to a new instruction being dispatched to an instruction issue queue in a processor, incrementing, by one or more computer processors, a future dependency count for each instruction of a plurality of instructions in the instruction issue queue, wherein the newly dispatched instruction has a dependency to the plurality of instructions of an issue queue;

prioritizing, by the one or more computer processors, the plurality of instructions in the instruction issue queue based on the future dependency count, wherein the plurality of instructions in the instruction issue queue based on the future dependency count comprises:

responsive to determining that one or more instructions of the plurality of instructions in the instruction issue queue have the future dependency count that exceeds a predetermined threshold, generating, by the one or more computer processors, a first list, wherein the first list contains the one or more instructions of the plurality of instructions in the instruction issue queue that have the future dependency count that exceeds the predetermined threshold and a second list, wherein the second list contains one or more instructions of the plurality of instructions in the instruction issue queue that have the future dependency count that is not greater than the predetermined threshold; and issuing, by the one or more computer processors, a highest priority instruction of the plurality of instructions in the instruction issue queue.

2. The computer-implemented method of claim 1, wherein the first list is stored in a forwarded queue, and further wherein the second list is stored in a not-forwarded queue.

3. The computer-implemented method of claim 1, wherein issuing the highest priority instruction of the plurality of instructions in the instruction issue queue comprises:

issuing, by the one or more computer processors, the highest priority instruction from the first list, wherein the highest priority instruction was received first, and further wherein the highest priority instruction has past dependencies resolved.

4. The computer-implemented method of claim 3, wherein issuing the highest priority instruction from the first list, wherein the highest priority instruction was received first, and further wherein the highest priority instruction has the past dependencies resolved further comprises:

responsive to a first number of instructions from the first list is less than a maximal number of instructions that can issue in a cycle, issuing, by the one or more computer processors, all of the instructions from the first list; and issuing, by the one or more computer processors, a second number of instructions from the second list, wherein the first number of instructions and the second number of instructions equal the maximal number of instructions that can issue in the cycle.

5. The computer-implemented method of claim 3, wherein issuing the highest priority instruction from the first list, wherein the highest priority instruction was received first, and further wherein the highest priority instruction has the past dependencies resolved further comprises:

responsive to determining that the first list is empty, issuing, by the one or more computer processors, an oldest instruction from the second list, wherein the oldest instruction was received first.

6. The computer-implemented method of claim 1, wherein each instruction of the plurality of instructions in the instruction issue queue includes the future dependency count.

7. A computer program product comprising one or more computer readable storage media and program instructions stored on the one or more computer readable storage media, the program instructions including instructions to:
responsive to a new instruction being dispatched to an instruction issue queue in a processor, increment a future dependency count for each instruction of a plurality of instructions in the instruction issue queue, wherein the newly dispatched instruction has a dependency to the plurality of instructions of an issue queue;
prioritize the plurality of instructions in the instruction issue queue based on the future dependency count, wherein prioritize the plurality of instructions in the instruction issue queue based on the future dependency count comprises one or more of the program instructions, stored on the one or more computer readable storage media, to:
responsive to determining that one or more instructions of the plurality of instructions in the instruction issue queue have the future dependency count that exceeds a predetermined threshold, generate a first list, wherein the first list contains the one or more instructions of the plurality of instructions in the instruction issue queue that have the future dependency count that exceeds the predetermined threshold, and a second list, wherein the second list contains one or more instructions of the plurality of instructions in the instruction issue queue that have the future dependency count that is not greater than the predetermined threshold; and
issue a highest priority instruction of the plurality of instructions in the instruction issue queue.

8. The computer program product of claim 7, wherein the first list is stored in a forwarded queue, and further wherein the second list is stored in a not-forwarded queue.

9. The computer program product of claim 7, wherein issue the highest priority instruction of the plurality of instructions in the instruction issue queue comprises one or more of the program instructions, stored on the one or more computer readable storage media, to:
issue the highest priority instruction from the first list, wherein the highest priority instruction was received first, and further wherein the highest priority instruction has past dependencies resolved.

10. The computer program product of claim 9, wherein issue the highest priority instruction from the first list, wherein the highest priority instruction was received first, and further wherein the highest priority instruction has the past dependencies resolved further comprises one or more of the program instructions, stored on the one or more computer readable storage media, to:
responsive to a first number of instructions from the first list is less than a maximal number of instructions that can issue in a cycle, issue all of the instructions from the first list; and
issue a second number of instructions from the second list, wherein the first number of instructions and the second number of instructions equal the maximal number of instructions that can issue in the cycle.

11. The computer program product of claim 9, wherein issue the highest priority instruction from the first list, wherein the highest priority instruction was received first, and further wherein the highest priority instruction has the past dependencies resolved further comprises one or more of the program instructions, stored on the one or more computer readable storage media, to:
responsive to determining that the first list is empty, issue an oldest instruction from the second list, wherein the oldest instruction was received first.

12. The computer program product of claim 7, wherein each instruction of the plurality of instructions in the instruction issue queue includes the future dependency count.

13. A computer system comprising:
one or more computer processors;
one or more computer readable storage media; and
program instructions stored on the one or more computer readable storage media for execution by at least one of the one or more computer processors, the stored program instructions including instructions to:
responsive to a new instruction being dispatched to an instruction issue queue in a processor, increment a future dependency count for each instruction of a plurality of instructions in the instruction issue queue, wherein the newly dispatched instruction has a dependency to the plurality of instructions of an issue queue;
prioritize the plurality of instructions in the instruction issue queue based on the future dependency count, wherein prioritize the plurality of instructions in the instruction issue queue based on the future dependency count comprises one or more of the program instructions, stored on the one or more computer readable storage media, to:
responsive to determining that one or more instructions of the plurality of instructions in the instruction issue queue have the future dependency count that exceeds a predetermined threshold, generate a first list, wherein the first list contains the one or more instructions of the plurality of instructions in the instruction issue queue that have the future dependency count that exceeds the predetermined threshold, and a second list, wherein the second list contains one or more instructions of the plurality of instructions in the instruction issue queue that have the future dependency count that is not greater than the predetermined threshold; and
issue a highest priority instruction of the plurality of instructions in the instruction issue queue.

14. The computer system of claim 13, wherein the first list is stored in a forwarded queue, and further wherein the second list is stored in a not-forwarded queue.

15. The computer system of claim 13, wherein issue the highest priority instruction of the plurality of instructions in the instruction issue queue comprises one or more of the program instructions, stored on the one or more computer readable storage media, to:
issue the highest priority instruction from the first list, wherein the highest priority instruction was received first, and further wherein the highest priority instruction has past dependencies resolved.

16. The computer system of claim 15, wherein issue the highest priority instruction from the first list, wherein the highest priority instruction was received first, and further wherein the highest priority instruction has the past dependencies resolved further comprises one or more of the program instructions, stored on the one or more computer readable storage media, to:
responsive to a first number of instructions from the first list is less than a maximal number of instructions that can issue in a cycle, issue all of the instructions from the first list; and issue a second number of instructions from the second list, wherein the first number of instructions and the second number of instructions equal the maximal number of instructions that can issue in the cycle.

17. The computer system of claim 15, wherein issue the highest priority instruction from the first list, wherein the highest priority instruction was received first, and further wherein the highest priority instruction has the past dependencies resolved further comprises one or more of the program instructions, stored on the one or more computer readable storage media, to:
  responsive to determining that the first list is empty, issue an oldest instruction from the second list, wherein the oldest instruction was received first.

* * * * *